United States Patent Office.

OSKAR ROTHMUND EDLER VON BURGWALL AND LEOPOLD OFENSCHÜSSL, OF VIENNA, AUSTRIA-HUNGARY.

PRIMARY ELEMENT WITH REGENERABLE NEGATIVE ELECTRODE.

SPECIFICATION forming part of Letters Patent No. 603,890, dated May 10, 1898.

Application filed December 9, 1896. Serial No. 615,064. (Model.) Patented in Germany October 25, 1896, No. 93,427, and in Austria November 9, 1896, No. 46/4,521.

*To all whom it may concern:*

Be it known that we, OSKAR ROTHMUND EDLER VON BURGWALL and LEOPOLD OFENSCHÜSSL, subjects of the Emperor of Austria-Hungary, residing at the city of Vienna, in the Province of Lower Austria, in the Empire of Austria-Hungary, have invented certain new and useful Improvements in Primary Elements with Regenerable Negative Electrodes, (for which we have obtained a patent in Austria, No. 46/4,521, bearing date November 9, 1896, and in Germany, No. 93,427, dated October 25, 1896,) of which the following is a specification.

This invention relates to primary batteries in which the electrodes are interchangeable and in which the negative electrode is regeneratory. The battery may be used for any purpose as a generator of current, but is specially valuable for portable lighting purposes. Heretofore the electric current used was principally generated by stationary dynamos and was conveyed to the place of consumption by means of conductors, or accumulators were used in which the current is stored. Accumulators must be recharged after use, a disadvantage which permits of their convenient use only in the neighborhood of charging-stations. The recharging and transportation of the accumulators make their use costly, and sometimes an accumulator becomes exhausted at a time and in a place where a charging-station cannot be reached. The existing primary batteries have also not been used in practice to any extent for portable lighting, owing to their complicated manipulation, their lack of durability, and their low and inconstant tension. Further, the strong liquid acids used generally in primary batteries produce poisonous gases or vapors of disagreeable odors.

The object of this invention is to provide a primary battery in which the described deficiencies are avoided and which forms a reliable transportable source of electricity.

An essential feature of this invention is that the complete batteries or the single electrodes are shipped in a dry condition, and when current is required then it is only necessary to add water. Neither acids, caustics, nor salts have to be put in as electrolyte, thus avoiding the deficiencies of the known primary batteries.

The negative electrode of this novel primary battery consists of a hard-lead frame whose fields are filled up with porous peroxid of lead in a similar manner as accumulator-plates are filled, the lead frame serving solely as conductor for the current. The positive electrode consists, preferably, of amalgamated zinc, or aluminium, magnesium, or iron may be used. The positive electrodes are strips of sheeting of the above metals and in size and form resemble the negative electrodes. The negative peroxid plates and water alone are not sufficient to produce a practical result. Therefore the peroxid plates undergo a certain treatment and are saturated with electrolytes—as, for instance, concentrated sulfuric acid, potassium or sodium hydrate, chromic acid, &c. The process of saturating the peroxid plates completely consists in freeing, first, the plates from air and moisture either by the electric current or by subjecting them in a drying-chamber to a temperature of about 150° centigrade in presence of hygroscopic substances—such as chlorid of calcium, for instance. The peroxid plate thus freed from air and moisture is now dipped into one of the mentioned liquids and absorbs the same, saturating itself completely therewith. The thus-saturated plates are now brought back into the drying-room for the purpose of evaporating the water contained in the electrolytes, when they will be ready for use. The solutions are held by the peroxid of lead, like nitroglycerin is held by the infusorial earth in dynamite. The saturated negative peroxid electrodes, however, have to be protected from moisture when not in use. This may be done by packing them in gutta-percha paper, lead-foil, &c.

The electrodes are mounted in suitable vessels, so that they can be replaced conveniently by new ones when exhausted. They are insulated from each other in any suitable way by plugs of insulating material. When it is desired to furnish current, then water is added. The absorbed liquid contained in the peroxid is gradually and successively lixiviated, thus producing an electrolyte whereby an efficient battery is formed. The electromotive force of these batteries is 2.4 to 2.6 volts, and the quantity is according to the size and surface of the electrodes employed. The duration of the battery depends on the thickness of the active peroxid plate and of the quantity of liquid absorbed therein. The positive electrode is used up very little, because it is amalgamated and causes no polarization.

The negative peroxid plate if exhausted—that is, when all the electrolyte is lixiviated—is taken out and dried and saturated again with an electrolyte, as above described, and may then be used over and over again until destroyed by general wear and tear.

The battery can be manufactured in any size and shape desired. The negative peroxid electrodes may be kept for any length of time when packed up so that moisture cannot reach them. They may be shipped to any place, and a battery can be put up everywhere, because only water is necessary to make it active.

The batteries are very well adapted for transportable lighting in railroad-cars, carriages, bicycles, mines, for military and sanitary purposes, and for portable search-lights in general. The relatively small weight makes them superior to accumulators, and from their construction it is apparent that they are superior to the primary batteries known so far.

Having thus described our invention, what we claim therein as new, and desire to secure by Letters Patent, is—

The process of manufacturing negative electrodes for primary batteries consisting in first preparing a peroxid plate of porous peroxid of lead on a lead frame then freeing this plate of air and moisture, then impregnating the peroxid with a water soluble concentrated electrolyte and then partially drying the electrodes so that they present dry surfaces, substantially as described.

In testimony whereof we have signed this specification in presence of two subscribing witnesses.

OSKAR ROTHMUND EDLER VON BURGWALL.
LEOPOLD OFENSCHÜSSL.

Witnesses:
ADOLPH FISCHER,
JOHANN M. POCHMANN.